Patented June 24, 1924.

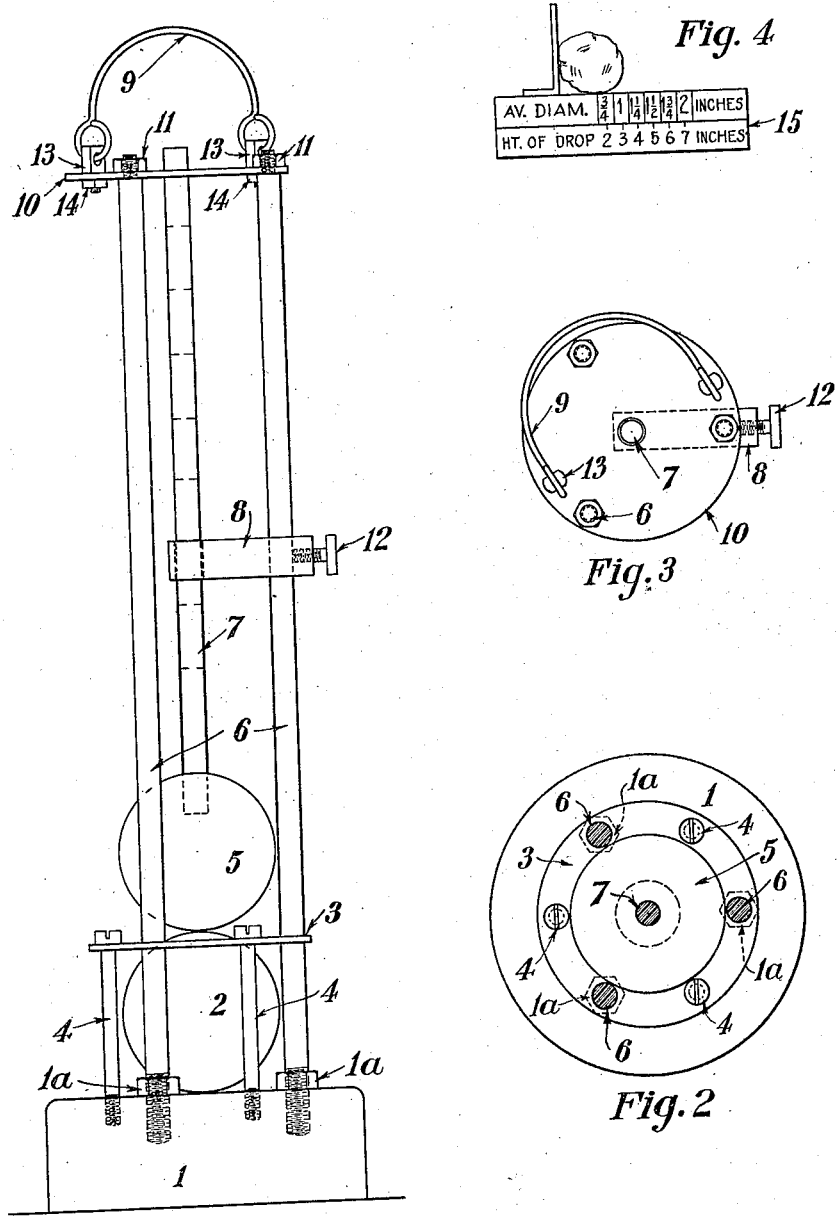

1,498,659

UNITED STATES PATENT OFFICE.

FRANK H. JACKSON, OF WASHINGTON, DISTRICT OF COLUMBIA, DEDICATED, BY MESNE ASSIGNMENTS, TO THE CITIZENS OF THE UNITED STATES.

IMPACT GRAVEL-TESTING APPARATUS.

Application filed September 4, 1923. Serial No. 660,900.
(FILED UNDER THE ACT OF MARCH 3, 1883, 22 STAT. L., 625.)

*To all whom it may concern:*

Be it known that I, FRANK H. JACKSON, a citizen of the United States of America, and an employee of the United States Department of Agriculture, residing at 1360 Taylor Street northwest, in the city of Washington, District of Columbia, have invented a new and useful Impact Gravel-Testing Apparatus.

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to me of any royalty thereon.

This invention pertains to an apparatus for determining the quality of aggregates for concrete. Although called an impact test, it must be understood that there is no attempt made to determine the actual resistance to impact or toughness of individual gravel fragments in the same sense that a toughness test of rock is made. The test is designed simply to differentiate between satisfactory and unsatisfactory materials as measured by the ability of each fragment to withstand a single blow of a hammer of known weight, the height of fall being such that only the soft or unsound, decomposed pieces will fracture. The proper height of fall for fragments of various diameters has been determined by experiment and is shown on the hereinafter-described scale 15. I attain these objects by means of mechanism illustrated in the accompanying drawings, in which—

Figure 1 is an elevation; Fig. 2, a plan section taken below stop 8 in Fig. 1; Fig. 3, a view of the top of the apparatus; and Fig. 4, a plan of the scale used.

Similar numerals refer to similar parts throughout the several views.

The base 1 of the apparatus consists of metal. Mounted on base 1 secured by metal ring 3 and held to the base by screws 4 is a steel ball 2. Screwed into base 1, and extending the height of the apparatus, are three steel guide rods 6, spaced 120° apart. These rods 6 fit lightly against ball 2, and are held into their position at the top by means of a metal plate 10 and nuts 11, and rigidly secured at the base 1 by means of nuts 1ª. Above ball 2, guided by rods 6, is the steel hammer ball 5, from the top of which extends the graduated rod 7. This rod 7 passes through the movable gage stop 8, and continues through the upper plate 10. The gage stop 8 slides on one of the rods 6, a thumb screw 12 holding it in desired location. A metal handle 9, connected with top plate 10 by means of bolts 13 passing through and held in position on top plate 10 by nuts 14, is of aid when carrying the apparatus.

When materials are to be tested the individual pieces are measured to determine the average diameter across the shortest dimension. Then from a scale 15 similar to the one shown in Fig. 4, the height of the fall is ascertained. Each piece is subjected to a single blow of the hammer ball 5, from a height determined by the scale 15. In setting the gage stop 8 for the fall desired, the specimen is held firmly on the ball 2, resting ball 5 on specimen and securing gage stop 8 at height desired on graduated rod 7. The ball 5 is then raised to the desired height and then released, thus permitting it to drop on to the specimen.

I claim:

An impact apparatus, comprising a metal anvil, a fixed steel ball rigidly mounted thereon, a vertically movable steel hammer ball, uprights for guiding said movable steel hammer ball, so as to provide for its free vertical fall directly above the fixed steel ball, a graduated rod attached rigidly to and forming a part of said movable hammer ball, and means for regulating the height of fall of the said movable hammer ball consisting of a stop for said movable hammer ball adapted to be secured at any desired position on one of the aforesaid uprights.

FRANK H. JACKSON.